Patented Nov. 8, 1938

2,135,909

UNITED STATES PATENT OFFICE 2,135,909

PROCESS FOR REMOVING MUD SHEATHS FROM GEOLOGICAL FORMATIONS

Louis T. Monson, Alhambra, Calif., assignor to Tretolite Company, Webster Groves, Mo., a corporation of Missouri No Drawing. Application August 21, 1936, Serial No. 97,173

6 Claims. (Cl. 166—21)

This invention relates to a method for overcoming the problem of the mudding-off of productive formations in wells, particularly oil wells and gas wells, and for restoring by chemical treatment the porosity of the wall surfaces of oil, gas, or other wells, which wall surfaces have been sealed or mudded off during the operation of drilling the wells by the rotary method.

The rotary method of drilling wells is well known. It is described, for example, in U. S. Patent No. 1,984,668, issued to Weir and Montgomery on December 18, 1934. In the rotary method, the use of drilling fluid or "mud-laden fluid" is accompanied by certain disadvantages which have not been entirely overcome to date, and which are so important that many methods have been proposed for overcoming them. The most important of these disadvantages is that the solids from the drilling fluid deposit on the walls of the productive formations penetrated by the drill bit as drilling proceeds, and may be dislodged therefrom only with difficulty. In the case of low-pressure formations, satisfactory removal of the mud solids may be and commonly is substantially impossible to achieve by any of the methods now practised.

It has been proposed that the problem may be overcome by subjecting the mud sheaths to the action of a reagent, e. g., a mineral acid, in such cases where the drilling mud contains sufficient amounts of a material which is capable of reacting with the first-named material, e. g., carbonates. It has also been proposed to incorporate in the drilling fluid a material which may be subsequently reacted upon by a reagent, with the result that such chemical reaction will disintegrate the mud sheath or deposit and dislodge it from the formation walls. This latter method has been described in one practical form in U. S. Bureau of Mines Report of Investigations No. 3249, June, 1934. The authors of that report propose to incorporate in the drilling fluid a proportion of limestone or calcium carbonate, and subsequently dissolve such material by reacting it with hydrochloric acid. While other mineral acids may be employed in this process broadly, it is customary to use hydrochloric acid, usually in 10–15% concentration.

I have found that, while such proposals theoretically supply simple and satisfactory means for preventing the undesirable residue of mud solids from persisting on the walls of the wall bore and interfering with the productivity of formations penetrated by such bore, in practice the results are not as good as is desired. I believe the reason for the shortcomings of the proposals lies in the fact that the acidic solution employed to react with the limestone or calcium carbonate, initially present in or incorporated in the drilling mud, is unable to contact such carbonate effectively, due to the coating of oil present on the carbonate particles. I have discovered that if the acidic reagent employed to react with the carbonate particles is of the nature disclosed hereinafter, the effectiveness of the acid is greatly enhanced.

In its broadest aspect, my process does not require that the mud sheaths to be subjected to the action of my reagent shall contain carbonates or similar reactive materials, either intentionally added to, or naturally present in, the drilling mud used. Neither does it require that the reagent employed shall act chemically on the mud sheath, or on some component thereof, in order to be effective. On the contrary, the reagent may be successfully used in instances where the mud sheaths are entirely devoid of, or contain only insignificant proportions of carbonates or similarly susceptible materials; and the reagent may operate by virtue of certain obscure physical or physico-chemical relationships set up or existing between the reagent and the mud sheath, rather than by any strictly chemical reaction.

The reagent which I propose to use for this purpose consists of a relatively stable aqueous dispersion, in which the disperse phase consists of a water-insoluble organic liquid capable of acting as an oil solvent, and the continuous aqueous acidic phase contains a mineral acid, the dispersion being stabilized by an organic dispersing agent capable of producing an oil-in-water dispersion. Such reagent, I have found, is capable of removing the oil coatings from the potentially reactive particles (e. g., carbonates) present in the mud sheaths, and leaves such particles more readily susceptible to the action of the reagent (e. g., a mineral acid) employed in the aqueous phase of the reagent to disintegrate them.

In general, the more concentrated acid solutions cause a reduction in the dispersing power of most dispersing agents, as do electrolytes in general, for which reason it may be necessary to use more of the dispersing agent than would be required to produce a water dispersion of the same stability. It may be preferable to use more dilute acid in preparing the reagent, rather than, e. g., the 10–15% concentration of acid commonly employed, in order to obtain a relatively stable dispersion of the kind described and required. The dispersing agent is preferably characterized by the fact that its calcium and magnesium salts are water-soluble; but so long as undesirable precipitates are not produced from any reaction between the reagent and other materials present in the well (e. g., soluble calcium and magnesium salts produced from carbonates by, and dissolved in, the acid used), this is immaterial. The dispersing agent may be of such nature that it is capable of inhibiting the action of mineral acid on the well equipment and fittings; but this is utterly immaterial to the success of my process.

By "relatively stable aqueous dispersion", I mean one that is not spontaneously resolved into its components, on standing, for protracted periods of time, e. g., for an hour or more.

I have found that satisfactory water-insoluble oil solvents are solvent naphtha, benzol, toluol, carbon tetrachloride, carbon bisulfide, tetralin, gasoline, kerosene, etc. The mineral acid I prefer to use is hydrochloric acid of concentrations up to 15%, although the concentration of the acid is not of vital importance, except that it should in general be kept below that concentration where the products resulting from the reaction with the mud solids become insoluble in the reagent. The organic dispersing agents that I have found most satisfactory are such materials as saponin, licorice, casein, glue, peptone, etc. In general, the organic dispersing agent is characterized by the fact that it is capable of producing a relatively stable aqueous dispersion of the water-insoluble oil solvents in the aqueous acidic material. It is not decomposed by mineral acids; or, if it is, such decomposition proceeds only very slowly. The ordinary well known organic dispersing agents are not all necessarily useful in preparing my reagent. For example, ordinary soap will not serve, in preparing my preferred reagent, disclosed below.

When it is desired to disperse an oil solvent in ordinary water, this may be readily accomplished by means of such materials as ordinary soap, petroleum sulfonates, sulfonated vegetable and animal oils, etc. However, when the aqueous phase, as in the present case, contains an acid, some of such dispersing agents (e. g., soaps) become useless, because they are decomposed by the acid. Others, I have found, become inoperative, because they are salted out of the aqueous phase by the acid. In such cases, I have found that they either fail to produce a dispersion at all, or else, actually produce a water-in-oil type of dispersion. While some of such conventional dispersing agents may be useless under all practical procedures, I have found that it is sometimes possible to use them by altering the acid concentration, the proportion of dispersing agent, or the phase volumes of the components of the dispersion.

As an example, only, of the reagent I prefer to use in my process, the following may be cited: Three parts by weight of saponin, and 20 parts by weight of solvent naphtha are dispersed in 100 parts by weight of 10% hydrochloric acid, using agitation, if necessary, to effect dispersion. A mixture of oil solvents may be employed, or a mixture of dispersing agents may be used, or a different mineral acid or mixture of acids may be used. The example is not intended to be exclusive. The proportions of ingredients, likewise, may be varied within wide limits to suit individual cases to best advantage. While the reagent so prepared may "cream", or show a concentration of dispersed phase at the top or the bottom of the container, the dispersed phase does not separate as such within an hour or more.

In broadest scope, my process consists in applying a reagent of the kind described to a mud sheath in a well bore. The mud sheath may contain sufficient carbonate materials to permit the reagent to act chemically to decompose such carbonates, and so disintegrate the sheath. The reagent may be effective by reacting chemically with other non-carbonate ingredients or components of the sheath. It may react, in some manner other than a strictly chemical one to accomplish the objective, i. e., dislodge the mud sheaths. A specific application of the process is found in instances where my reagent is applied to sheaths in which carbonate materials have been intentionally incorporated in the drilling mud solids prior to their use, as described in the U. S. Bureau of Mines Report of Investigations No. 3249, dated June, 1934, previously mentioned. The following example illustrates this specific procedure for applying my process, although in practising my process the procedure may be varied to suit individual requirements.

The example will illustrate the general procedure without limiting the scope of the invention. An amount of limestone, crushed to pass 150-mesh screen, is added to the drilling fluid to be used, in the proportion of 20–30 pounds per barrel. The well bore is then drilled by the rotary method, using the mud fluid so prepared. After drilling, the mud fluid remaining in the hole is washed out by circulating water until the returns are clear, or by bailing. Sufficient of my reagent at least to cover the productive formation is then introduced into the well bore by merely pouring it into the casing, by means of tubing, by means of a dump bailer, or by other means. Pressure may be applied to the reagent in the well by any desired means, such as an air compressor, or by injecting a head of oil into the well. In general, I prefer to keep the pressure fairly low, to accelerate the formation and escape of carbon dioxide bubbles. The reagent is allowed to remain in the well until disintegration of the mud sheath is believed complete, and usually less than 24 hours; after which it is pumped or preferably bailed out, along with the disintegrated mud sheaths. I have found that agitating the reagent in the well, for example, by means of a swab, greatly accelerates its action on the mud sheaths.

Having thus described my invention, what I claim as new and desire to secure by Letters Patent is:

1. A process for removing mud sheaths from well bores, which consists in subjecting such sheaths to the action of a relatively stable aqueous emulsion of the oil-in-water type, in which the disperse phase is a water-insoluble oil solvent, and the continuous aqueous phase contains a reagent, capable of reacting chemically with a component of said mud sheaths, which dispersion is stabilized by an organic dispersing agent.

2. A process for removing mud sheaths from well bores, which consists in subjecting such sheaths to the action of a relatively stable oil-in-acid emulsion, in which the disperse phase is a water-insoluble oil solvent, and the continuous aqueous phase contains a mineral acid, which dispension is stabilized by an organic dispersing agent.

3. A process for removing mud sheaths from well bores, which consists in subjecting such sheaths to the action of a relatively stable oil-in-acid emulsion, in which the disperse phase is a water-insoluble oil solvent, and the continuous aqueous phase contains hydrochloric acid, which dispersion is stabilized by an organic dispersing agent.

4. A process for removing mud sheaths from geological formations penetrated in the drilling of wells by methods involving the use of drilling fluid, which consists in incorporating in such drilling fluid a substance capable of reacting chemically with a given reagent; and subsequent to drilling the well with such fluid, subjecting the mud sheaths present in the well bore to the action of a relatively stable aqueous emulsion of the oil-in-water type, in which the disperse phase is a water-insoluble oil solvent, and the continuous aqueous phase contains the reagent, capable of reacting chemically with the substance incorporated in the drilling fluid, which dispersion is stabilized by an organic dispersing agent.

5. A process for removing mud sheaths from geological formations penetrated in the drilling of wells by methods involving the use of drilling fluid, which consists in incorporating in such drilling fluid a substance capable of reacting chemically with a mineral acid; and subsequent to drilling the well with such fluid, subjecting the mud sheaths present in the well bore to the action of a relatively stable oil-in-acid emulsion, in which the disperse phase is a water-insoluble oil solvent, and the continuous aqueous phase contains a mineral acid, which dispersion is stabilized by an organic dispersing agent.

6. A process for removing mud sheaths from geological formations penetrated during the drilling of wells by methods involving the use of drilling fluid, which consists in incorporating in such drilling fluid a substance capable of reacting chemically with hydrochloric acid; and subsequent to drilling the well with such fluid, subjecting the mud sheaths present in the well bore to the action of a relatively stable oil-in-acid emulsion, in which the disperse phase is a water-insoluble oil solvent, and the continuous aqueous phase contains hydrochloric acid, which dispersion is stabilized by an organic dispersing agent.

LOUIS T. MONSON.